UNITED STATES PATENT OFFICE.

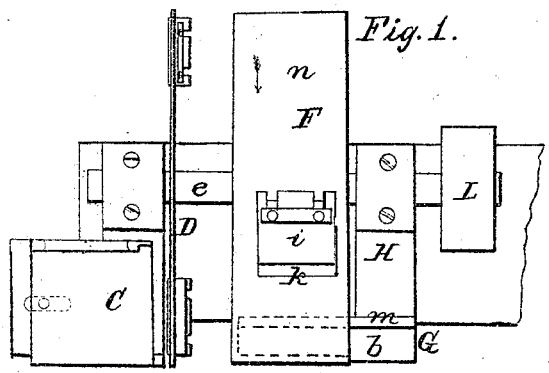

RUSSELL D. BARTLETT, OF BANGOR, MAINE.

MACHINE FOR MAKING THE HEADS OF SHOVEL-HANDLES.

Specification of Letters Patent No. 11,288, dated July 11, 1854.

*To all whom it may concern:*

Be it known that I, RUSSELL D. BARTLETT, of Bangor, in the county of Penobscot and State of Maine, have invented a new and useful Improvement in Machinery for Manufacturing the Hand Parts or Heads of Shovel-Handles; and I do hereby declare that the same is fully described and represented in the following specification and the accompanying drawings, letters, figures, and references thereof.

Of the said drawings, Figure 1 represents a top view of the mechanism constituting my invention. Fig. 2 is a front elevation of the same. Fig. 3 is a vertical section of the dished wheel, F, to be hereinafter described. Fig. 4 denotes a top view and Fig. 5 a side view of a shovel handle.

The D or head part, or that part, A, which is united to the shank, B, is made with a concave curve (in a longitudinal direction) from $a$ to $b$ and with a convex curve in a transverse direction or from $c$ to $d$. It is also made with an opening E' for the reception of the hand of a person. The underside of the head A is made a plane surface, the same being formed by applying or holding it on a rest, C, and against the face of a rotary wheel or disk, D, provided with rotary cutters E, E. In order to correctly form the upper curved surface of the head part A or impart to it a curve as seen at $a\ b$, Fig. 5, I make use of a dished wheel F, a vertical section of which as taken in line of its axis is given in Fig. 3, while Fig. 6 denotes a horizontal section of said wheel taken just above the shelf, $l$, to be hereinafter described and showing the mode of applying the shovel handle to the wheel, while the latter is in revolution. The said dished wheel F consists of a flat disk $c$, (or its equivalent) united to a projecting limb or flanch $d$, which is a circular ring in section taken in a plane perpendicular to its shaft $e$, while it is curved to a larger radius from where it joins the disk to its opposite edge, the curve being shown at $g$, $h$, and $g'$, $h'$ in Figs. 2 and 3. This dished wheel is provided with one or more cutters, $i$, each of which extends through a throat $k$ (made through the rim of the wheel) and has its cutting edge projecting inward from the inside surface of the rim. The cutter is shaped so as to form the curve $a$, $b$, as seen in Fig. 5. Each cutter is so applied to the wheel, and there may be thereon such a number of them as circumstances may require. Into the wheel a rest, G, projects from a standard, H. This rest consists of a shelf, $l$, and a bearer plate, $m$, the latter being raised on and vertically above the said shelf.

In the process of forming the curved surface of the head, A, such head is passed into the wheel and with its plane surface resting against the bearer, $m$, the head at the same time being supported on the shelf, $l$, the cutter being put in motion in the direction as denoted by the arrow, $n$. The shovel handle is gradually turned horizontally from the position seen at I into that represented by dotted lines at K. In so doing it will be cut down or curved in two directions, that is both longitudinally and transversely as hereinbefore described.

The bearer of the rest is so placed with respect to the rim that sustains the cutters, that its inner edge or end shall be at a distance from the rim equal to or a little greater than the distance from $b$ to $f$ in Fig. 5, or in other words the greatest thickness of the head, A. This will enable the head to be so turned or moved under the operation of the cutters as to cause them to impart to it a curved surface of the required form. The wheel is rotated by a band made to operate the pulley, L, fixed upon the shaft of the wheel.

Having thus described my invention what I claim is—

To so construct the dished wheel F, and its cutters, $i$, and apply them together substantially as described in combination with so constructing the bearing rest, G, with a shelf, $l$, and bearer plate, $m$, (or equivalent contrivances) and applying it to the wheel so as to cause it to extend within the wheel and enable a person to introduce the shovel head into it and between it and the inner surface of the wheel and support said shovel head and turn it against the cutters so as to cut it curved in two directions as specified.

In testimony whereof I have hereunto set my signature this twenty fourth day of April A. D. 1854.

RUSSELL D. BARTLETT.

Witnesses:
SAMUEL F. HUMPHREY,
CHARLES HIGHT.